(12) United States Patent
Chung et al.

(10) Patent No.: US 8,408,361 B2
(45) Date of Patent: Apr. 2, 2013

(54) LADDER ASSEMBLY HAVING THE FUNCTION OF A CARRIER

(75) Inventors: Chen-Yu Chung, Taichung (TW); Zi-Cong Wen, Dongguan (TW)

(73) Assignee: Shih-Ming Lin, Dongguan (CN)

( * ) Notice: Subject to any disclaimer, the term of this patent is extended or adjusted under 35 U.S.C. 154(b) by 350 days.

(21) Appl. No.: 12/782,747

(22) Filed: May 19, 2010

(65) Prior Publication Data

US 2011/0284325 A1 Nov. 24, 2011

(51) Int. Cl.
*E06C 1/02* (2006.01)
(52) U.S. Cl. .............. 182/21; 182/20; 280/30; 280/646
(58) Field of Classification Search .............. 182/21, 182/20; 280/30, 47.29, 646
See application file for complete search history.

(56) References Cited

U.S. PATENT DOCUMENTS

| | | | | |
|---|---|---|---|---|
| 4,253,546 | A * | 3/1981 | Uchida | 182/20 |
| 4,917,392 | A * | 4/1990 | Ambasz | 280/40 |
| 4,993,727 | A * | 2/1991 | vom Braucke et al. | 280/40 |
| 5,308,096 | A * | 5/1994 | Smith | 280/204 |
| 5,348,325 | A * | 9/1994 | Abrams | 280/40 |
| 6,053,514 | A * | 4/2000 | Su | 280/40 |
| 6,173,811 | B1 * | 1/2001 | Tornabene et al. | 182/20 |
| 6,308,967 | B1 * | 10/2001 | Stallbaumer et al. | 280/47.18 |
| 6,877,586 | B2 * | 4/2005 | Babkes et al. | 182/20 |
| 7,140,635 | B2 * | 11/2006 | Johnson et al. | 280/646 |
| 7,387,306 | B2 * | 6/2008 | Zimmer | 280/47.29 |
| 7,441,785 | B1 * | 10/2008 | Tsai | 280/47.29 |
| 2002/0185844 | A1 * | 12/2002 | Gregory | 280/652 |
| 2005/0285359 | A1 * | 12/2005 | Wang | 280/47.29 |

OTHER PUBLICATIONS

Definition of ladder in Action The American Heritage® Dictionary of the English Language, Fourth Edition copyright © 2000 by Houghton Mifflin Company. Updated in 2009. Published by Houghton Mifflin Company. All rights reserved.*

* cited by examiner

*Primary Examiner* — Alvin Chin Shue
*Assistant Examiner* — Daniel Cahn
(74) *Attorney, Agent, or Firm* — Alan Kamrath; Kamrath IP Lawfirm, P.A.

(57) ABSTRACT

A ladder assembly includes a ladder, two wheel carriers mounted on the ladder movably and rotatably, two wheels each rotatably mounted on a respective one of the wheel carriers, two fastening members each extended through a respective one of the wheel carriers and each secured on the ladder to attach the respective wheel carrier to the ladder, and a support rack pivotally mounted on the ladder. Thus, when the support rack and the wheels are expanded outward from the ladder, the ladder assembly can function as a carrier, and when the support rack and the wheels are folded onto the ladder, the ladder assembly can function as a ladder so that the ladder assembly both functions as a ladder and a carrier, thereby enhancing the versatility of the ladder assembly.

11 Claims, 5 Drawing Sheets

LADDER ASSEMBLY HAVING THE FUNCTION OF A CARRIER

BACKGROUND OF THE INVENTION

1. Field of the Invention

The present invention relates to a stepping device and, more particularly, to a ladder assembly to facilitate a user climbing to a higher position.

2. Description of the Related Art

A conventional ladder has a substantially A-shaped profile and comprises two frames pivotally connected with each other, a plurality of steps mounted on each of the frames, and two pivotable braces each pivotally mounted between the frames. However, the conventional ladder only has a single function, thereby limiting the versatility of the conventional ladder.

BRIEF SUMMARY OF THE INVENTION

In accordance with the present invention, there is provided a ladder assembly, comprising a ladder, two wheel carriers mounted on the ladder movably and rotatably, two wheels each rotatably mounted on a respective one of the two wheel carriers, two fastening members each extended through a respective one of the two wheel carriers and each secured on the ladder to attach the respective wheel carrier to the ladder, and a support rack pivotally mounted on the ladder.

Each of the two wheel carriers has a surface formed with an elongate oblique guide slot which is slidable on the respective fastening member so that each of the two wheel carriers is movable and rotatable on the respective fastening member by guidance of the guide slot.

The ladder includes a substantially inverted U-shaped front frame and a rear frame pivotally connected with the front frame. Each of the two wheel carriers has a lower end provided with a washer abutting the support rack. The support rack has a side provided with two pivot brackets each pivotally mounted on the front frame of the ladder and each abutting the washer of a respective one of the two wheel carriers.

Each of the two pivot brackets of the support rack is pivotally mounted on the front frame of the ladder by a pivot shaft. Each of the two pivot brackets of the support rack has an upper abutting edge that is movable to abut the washer of the respective wheel carrier and a front abutting edge that is movable to abut the washer of the respective wheel carrier. The distance between the upper abutting edge of each of the two pivot brackets and the pivot shaft is greater than that between the front abutting edge of each of the two pivot brackets and the pivot shaft so that the pivot shaft is eccentrically mounted on each of the two pivot brackets of the support rack.

The primary objective of the present invention is to provide a ladder assembly having the function of a carrier.

According to the primary advantage of the present invention, when the support rack and the wheels are expanded outward from the front frame of the ladder, the ladder assembly can function as a carrier, and when the support rack and the wheels are folded onto the front frame of the ladder, the ladder assembly can function as a ladder so that the ladder assembly both functions as a ladder and a carrier, thereby enhancing the versatility of the ladder assembly.

According to another advantage of the present invention, the support rack and the wheels are expanded outward from and folded onto the front frame of the ladder easily and quickly, thereby facilitating operating the ladder assembly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
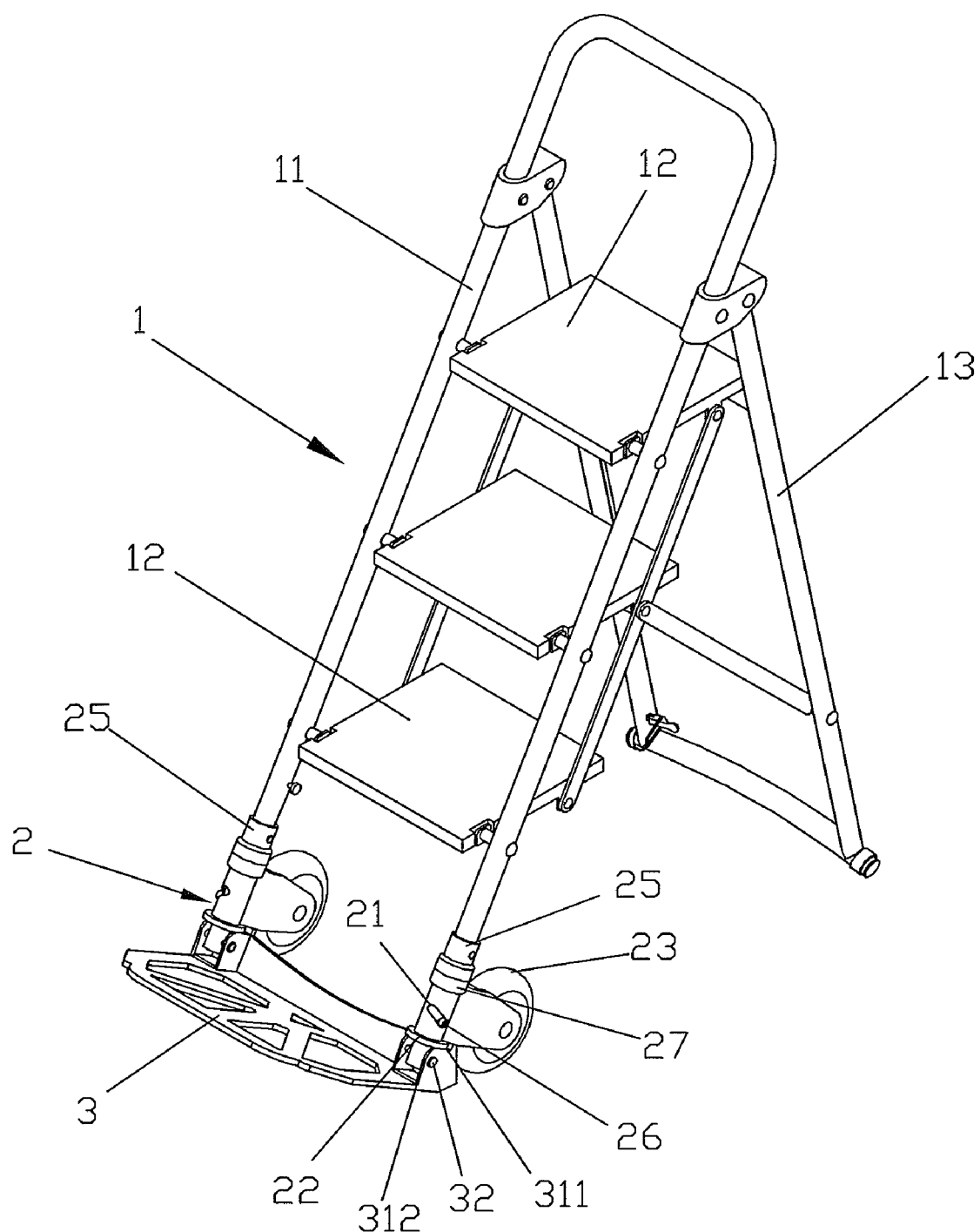
FIG. 1 is a perspective view of a ladder assembly in accordance with the preferred embodiment of the present invention.

Referring to the drawings and initially to FIGS. 1-4, a ladder assembly in accordance with the preferred embodiment of the present invention comprises a ladder 1, two wheel carriers 2 mounted on the ladder 1 movably and rotatably, two wheels 23 each rotatably mounted on a respective one of the two wheel carriers 2, two fastening members 26 each extended through a respective one of the two wheel carriers 2 and each secured on the ladder 1 to attach the respective wheel carrier 2 to the ladder 1, and a support rack 3 pivotally mounted on the ladder 1.

The ladder 1 includes a substantially inverted U-shaped front frame 11, a rear frame 13 pivotally connected with the front frame 11 and a plurality of steps 12 pivotally mounted on the front frame 11 and disposed between the front frame 11 and the rear frame 13.

The ladder assembly further comprises two fixing sleeves 25 each secured on the front frame 11 of the ladder 1, and two compression springs 24 each mounted on the front frame 11 of the ladder 1 and each biased between a respective one of the two fixing sleeves 25 and a respective one of the two wheel carriers 2 to push the respective wheel carrier 2 toward the support rack 3. Each of the two fixing sleeves 25 is disposed above the respective wheel carrier 2 and has a lower end formed with an enlarged recessed mounting portion 251 to receive the respective compression spring 24.

Each of the two wheel carriers 2 is disposed above the support rack 3 and is movable relative to the support rack 3. Each of the two wheel carriers 2 is movably mounted on the front frame 11 of the ladder 1 and is rotatable about the front frame 11 of the ladder 1. Each of the two wheel carriers 2 has a surface formed with an elongate oblique guide slot 21 which is slidable on the respective fastening member 26 so that each of the two wheel carriers 2 is movable and rotatable on the respective fastening member 26 by guidance of the guide slot 21. Each of the two wheel carriers 2 has an upper end formed with an enlarged recessed mounting section 27 to receive the respective compression spring 24. Each of the two wheel carriers 2 has a lower end provided with a washer 22 abutting the support rack 3. The guide slot 21 of each of the two wheel carriers 2 is disposed between the mounting section 27 and the washer 22.

The support rack 3 has a side provided with two pivot brackets 31 each pivotally mounted on the front frame 11 of the ladder 1 and each abutting the washer 22 of a respective one of the two wheel carriers 2. Each of the two pivot brackets 31 of the support rack 3 is pivotally mounted on the front frame 11 of the ladder 1 by a pivot shaft 32. The pivot shaft 32 is extended through and secured in the front frame 11 of the ladder 1. The pivot shaft 32 is extended through each of the two pivot brackets 31 of the support rack 3. Each of the two pivot brackets 31 of the support rack 3 has an upper abutting edge 311 that is movable to abut the washer 22 of the respective wheel carrier 2 and a front abutting edge 312 that is movable to abut the washer 22 of the respective wheel carrier 2. The distance between the upper abutting edge 311 of each of the two pivot brackets 31 and the pivot shaft 32 is greater than that between the front abutting edge 312 of each of the two pivot brackets 31 and the pivot shaft 32 so that the pivot shaft 32 is eccentrically mounted on each of the two pivot brackets 31 of the support rack 3.

Figure 4:
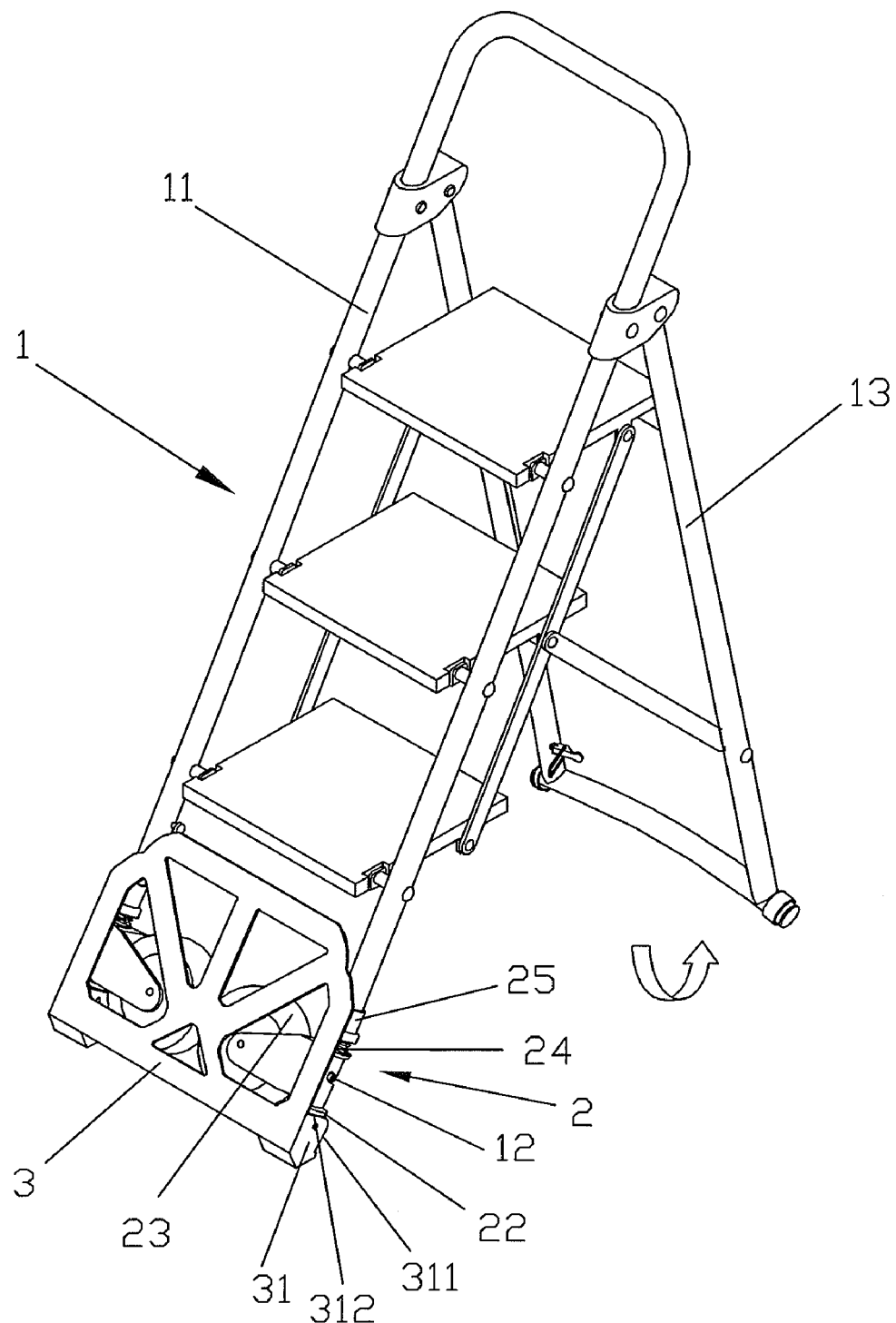
FIG. 4 is a schematic operational view of the ladder assembly as shown in FIG. 3.

In practice, the support rack 3 is movable relative to the front frame 11 of the ladder 1 between a first position as shown in FIG. 1 where the support rack 3 is in front of and perpendicular to the front frame 11 of the ladder 1, the upper abutting edge 311 of each of the two pivot brackets 31 abuts the washer 22 of the respective wheel carrier 2, each of the two fastening members 26 abuts a bottom of the guide slot 21 of the respective wheel carrier 2 and each of the two wheels 23 is in rear of and perpendicular to the front frame 11 of the ladder 1, and a second position as shown in FIG. 4 where the support rack 3 is in front of and parallel with the front frame 11 of the ladder 1, the front abutting edge 312 of each of the two pivot brackets 31 abuts the washer 22 of the respective wheel carrier 2, each of the two fastening members 26 abuts a top of the guide slot 21 of the respective wheel carrier 2 and each of the two wheels 23 is in rear of and parallel with the front frame 11 of the ladder 1.

Figure 2:
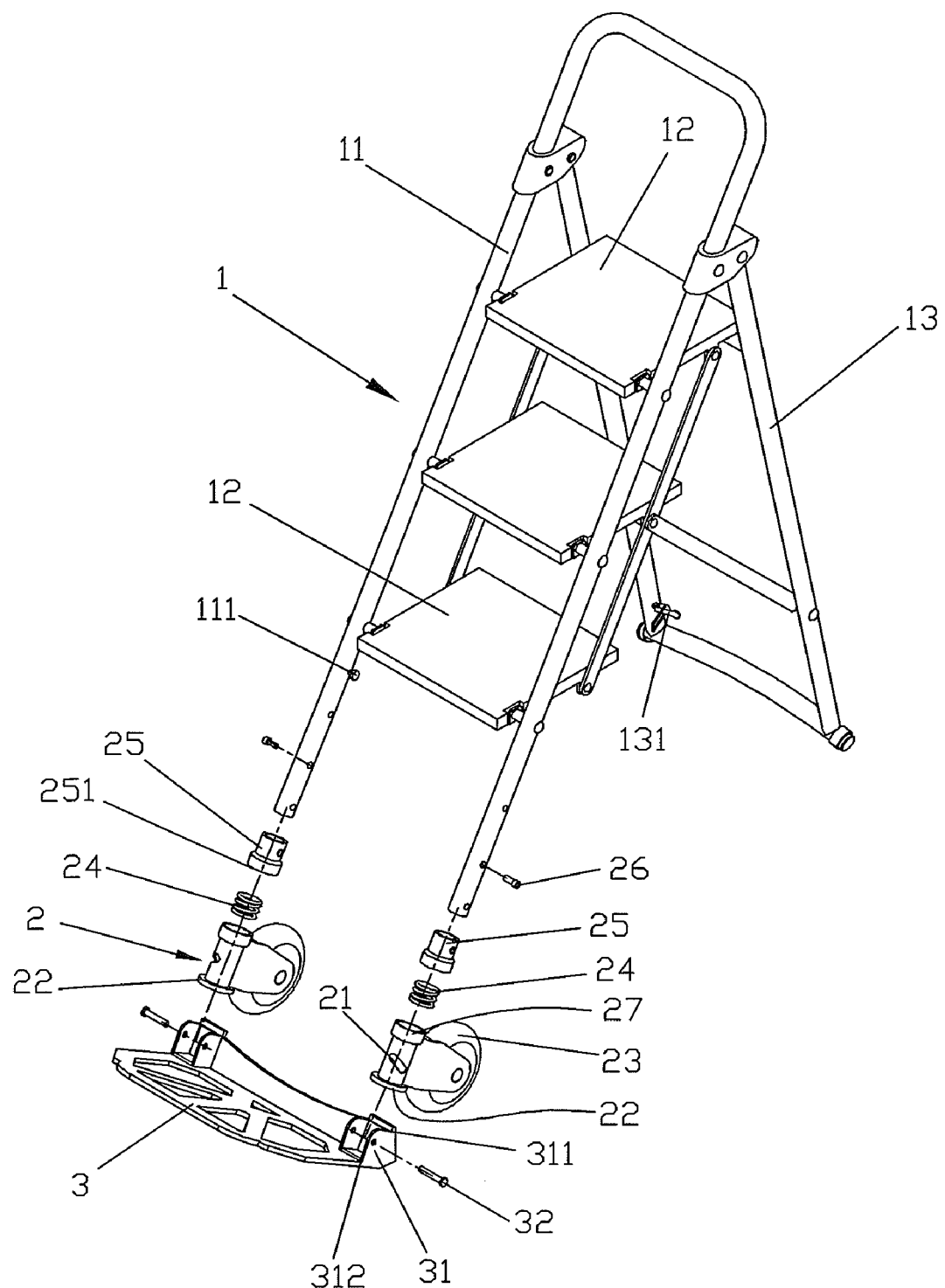
FIG. 2 is an exploded perspective view of the ladder assembly as shown in FIG. 1.
Figure 3:
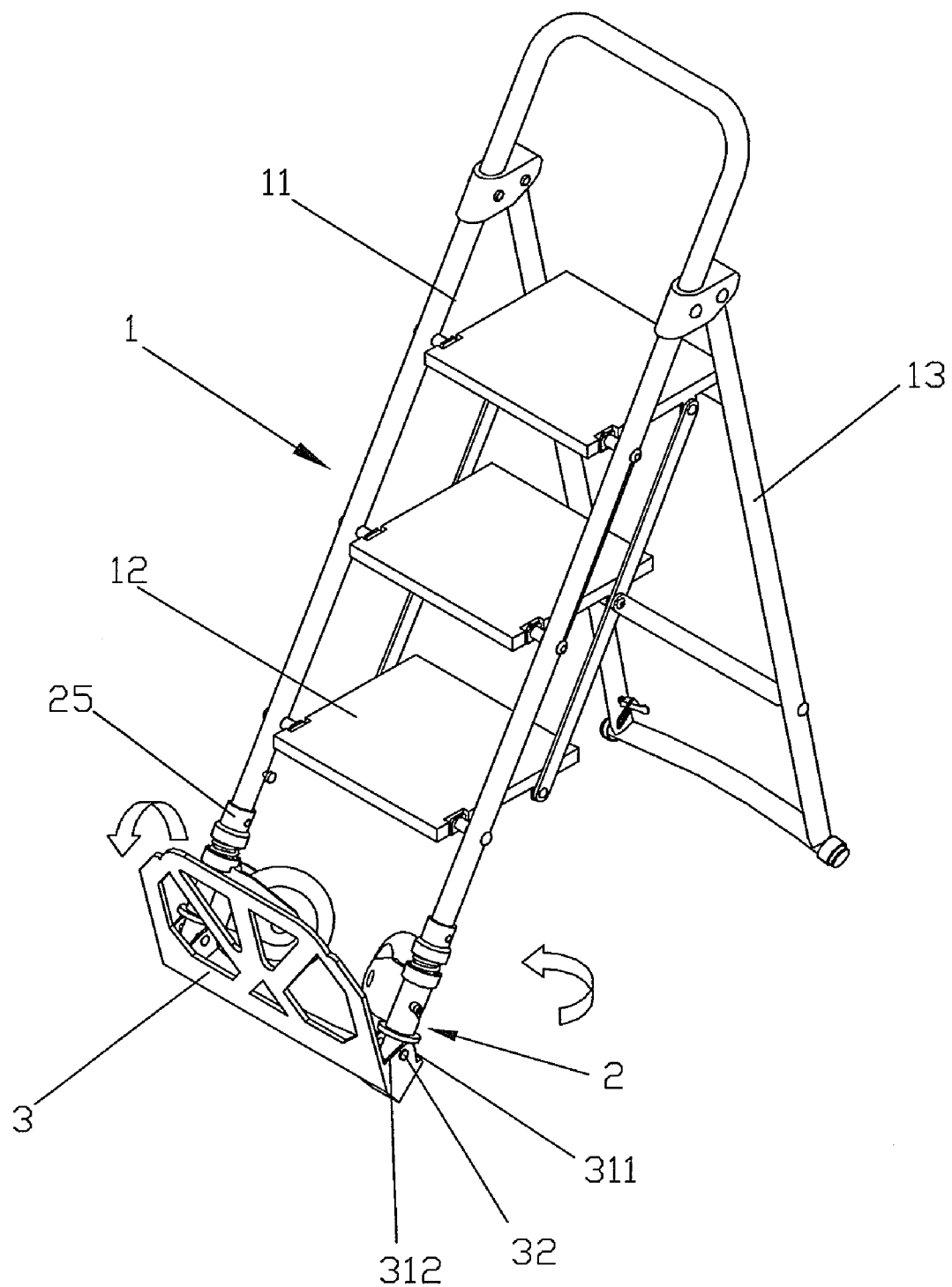
FIG. 3 is a schematic operational view of the ladder assembly as shown in FIG. 1.

In operation, referring to FIGS. 3 and 4 with reference to FIGS. 1 and 2, the support rack 3 and the two wheels 23 are initially expanded outward as shown in FIG. 1 so that the ladder assembly can function as a carrier to carry a cargo, such as a luggage and the like. At this time, the upper abutting edge 311 of each of the two pivot brackets 31 abuts the washer 22 of the respective wheel carrier 2.

When the support rack 3 is moved toward the front frame 11 of the ladder 1, each of the two pivot brackets 31 of the support rack 3 is moved from the position as shown in FIG. 1 through the position as shown in FIG. 3 to the position as shown in FIG. 4, so that the front abutting edge 312 of each of the two pivot brackets 31 is moved to face the washer 22 of the respective wheel carrier 2, and the support rack 3 is moved to abut the front frame 11 of the ladder 1. In such a manner, each of the two wheel carriers 2 is pushed downward toward the respective pivot bracket 31 of the support rack 3 by the restoring force of the respective compression spring 24 so that the guide slot 21 of each of the two wheel carriers 2 is moved on the respective fastening member 26, each of the two wheel carriers 2 is rotated about the front frame 11 of the ladder 1, each of the two wheels 23 is moved to abut the front frame 11 of the ladder 1, and each of the two fastening members 26 abuts the top of the guide slot 21 of the respective wheel carrier 2. Thus, the support rack 3 and each of the two wheels 23 are folded onto the front frame 11 of the ladder 1 as shown in FIG. 4.

On the contrary, when the support rack 3 is moved outward relative to the front frame 11 of the ladder 1, each of the two pivot brackets 31 of the support rack 3 is moved from the position as shown in FIG. 4 through the position as shown in FIG. 3 to the position as shown in FIG. 1, so that the upper abutting edge 311 of each of the two pivot brackets 31 is moved to press the washer 22 of the respective wheel carrier 2 and to compress the respective compression spring 24, and the support rack 3 is moved outward from the front frame 11 of the ladder 1. In such a manner, each of the two wheel carriers 2 is pushed upward so that the guide slot 21 of each of the two wheel carriers 2 is moved on the respective fastening member 26, each of the two wheel carriers 2 is rotated about the front frame 11 of the ladder 1, each of the two wheels 23 is moved outward from the front frame 11 of the ladder 1, and each of the two fastening members 26 abuts the bottom of the guide slot 21 of the respective wheel carrier 2. Thus, the support rack 3 and each of the two wheels 23 are expanded outward from the front frame 11 of the ladder 1 as shown in FIG. 1.

Figures 5, 6:
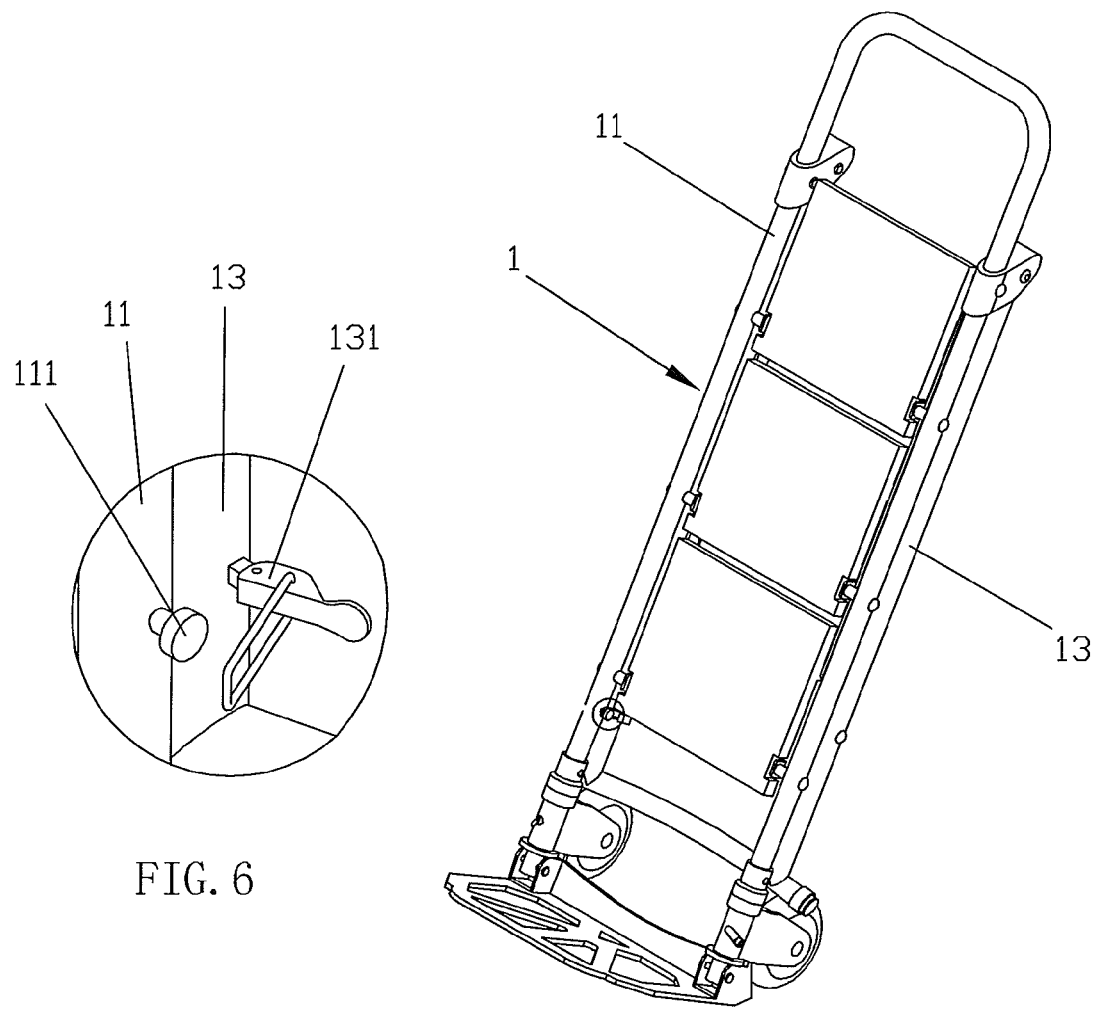
FIG. 5 is a schematic operational view of the ladder assembly as shown in FIG. 4.
FIG. 6 is a locally enlarged view of the ladder assembly as shown in FIG. 5.

Referring to FIGS. 5 and 6, the ladder 1 further includes a fixed knob 111 mounted on the front frame 11, and a snap locking member 131 pivotally mounted on the rear frame 13 and detachably locked onto the fixed knob 111 to releasably lock the rear frame 13 onto the front frame 11 when the rear frame 13 abuts the front frame 11.

Accordingly, when the support rack 3 and the wheels 23 are expanded outward from the front frame 11 of the ladder 1, the ladder assembly can function as a carrier, and when the support rack 3 and the wheels 23 are folded onto the front frame 11 of the ladder 1, the ladder assembly can function as a ladder so that the ladder assembly both functions as a ladder and a carrier, thereby enhancing the versatility of the ladder assembly. In addition, the support rack 3 and the wheels 23 are expanded outward from and folded onto the front frame 11 of the ladder 1 easily and quickly, thereby facilitating operating the ladder assembly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A ladder assembly, comprising:
a ladder;
two wheel carriers mounted on the ladder movably and rotatably;
two wheels each rotatably mounted on a respective one of the two wheel carriers;
two fastening members each extended through a respective one of the two wheel carriers and each secured on the ladder to attach the respective wheel carrier to the ladder;
a support rack pivotally mounted on the ladder;
wherein each of the two wheel carriers has a surface formed with an elongate oblique guide slot which is slidable on the respective fastening member
so that each of the two wheel carriers moves and rotates about the ladder as a direct result of being pushed into the respective fastening member which sits within and directly contacts the respective guide slot for guiding the respective wheels carriers;
the ladder includes a front frame and a rear frame pivotally connected with the front frame;
each of the two wheel carriers has a lower end provided with a washer abutting the support rack;
the support rack has a side provided with two pivot brackets each pivotally mounted on the front frame of the ladder and each abutting the washer of a respective one of the two wheel carriers;

each of the two pivot brackets of the support rack is pivotally mounted on the front frame of the ladder by a respective one of two pivot shafts;

each of the two pivot brackets of the support rack has an upper abutting edge that is movable to abut the washer of the respective wheel carrier and a front abutting edge that is movable to abut the washer of the respective wheel carrier;

a distance between the upper abutting edge of each of the two pivot brackets and the respective pivot shaft is greater than that between the front abutting edge of each of the two pivot brackets and the respective pivot shaft;

each of the pivot shafts is eccentrically mounted on the respective pivot bracket of the support rack;

the ladder assembly further comprises:

two fixing sleeves each secured on the front frame of the ladder;

two compression springs each mounted on the front frame of the ladder and each biased between a respective one of the two fixing sleeves and a respective one of the two wheel carriers to push the respective wheel carrier toward the support rack.

2. The ladder assembly of claim 1, wherein the ladder further includes:

a fixed knob mounted on the front frame;

a snap locking member pivotally mounted on the rear frame and detachably locked onto the fixed knob to releasably lock the rear frame onto the front frame when the rear frame abuts the front frame.

3. The ladder assembly of claim 1, wherein the support rack is movable relative to the front frame of the ladder between a first position where the support rack is in front of and perpendicular to the front frame of the ladder, the upper abutting edge of each of the two pivot brackets abuts the washer of the respective wheel carrier, each of the two fastening members abuts a bottom of the guide slot of the respective wheel carrier and each of the two wheels is in rear of and perpendicular to the front frame of the ladder, and a second position where the support rack is in front of and parallel with the front frame of the ladder, the front abutting edge of each of the two pivot brackets abuts the washer of the respective wheel carrier, each of the two fastening members abuts a top of the guide slot of the respective wheel carrier and each of the two wheels is in rear of and parallel with the front frame of the ladder.

4. The ladder assembly of claim 3, wherein each of the two fixing sleeves is disposed above the respective wheel carrier;

each of the two wheel carriers is disposed above the support rack;

each of the two wheel carriers is movable relative to the support rack.

5. The ladder assembly of claim 4, wherein each of the two wheel carriers is movably mounted on the front frame of the ladder;

each of the two wheel carriers is rotatable about the front frame of the ladder.

6. The ladder assembly of claim 1, wherein each of the two fixing sleeves has a lower end formed with an enlarged recessed mounting portion to receive the respective compression spring.

7. The ladder assembly of claim 1, wherein each of the two wheel carriers has an upper end formed with an enlarged recessed mounting section to receive the respective compression spring.

8. The ladder assembly of claim 7, wherein the guide slot of each of the two wheel carriers is disposed between the mounting section and the washer of each of the two wheel carriers.

9. The ladder assembly of claim 1, wherein each of the pivot shafts is extended through and secured in the front frame of the ladder.

10. The ladder assembly of claim 1, wherein each of the pivot shafts is extended through each of the two pivot brackets of the support rack.

11. The ladder assembly of claim 1, wherein the ladder further includes and a plurality of steps pivotally mounted on the front frame and disposed between the front frame and the rear frame.

\* \* \* \* \*